Patented July 31, 1945

2,380,879

UNITED STATES PATENT OFFICE 2,380,879

SOLUBLE BENZYL ETHER OF DEXTRAN

Grant L. Stahly, Columbus, Ohio, and Warner W. Carlson, Pittsburgh, Pa., assignors to Chemical Developments Corporation, Dayton, Ohio, a corporation of Ohio No Drawing. Original application February 26, 1938, Serial No. 192,887, now Patent No. 2,328,036, dated August 31, 1943. Divided and this application March 31, 1944, Serial No. 528,956.

1 Claim. (Cl. 260—209)

This invention deals with soluble benzyl ether of dextran and is a division of the following prior applications:

| Serial No. | Date filed | Patent No. | Date granted |
|---|---|---|---|
| 192,887 | Feb. 26, 1938 | 2,328,036 | Aug. 31, 1943. |
| 415,936 | Oct. 21, 1941 | | |
| 470,862 | Dec. 31, 1942 | | |
| 495,361 | July 19, 1943 | | |
| 495,362 | ----- do ----- | | |

More particularly this invention deals with benzyl ether of dextran soluble in commercial solvents of the general type employed for dissolving nitrocellulose.

In our prior patent No. 2,203,704, dated June 11, 1940, we have described and claimed a method of producing ethers of dextran which are insoluble in the aforementioned type of solvents. The products resulting from the practice of said method are described and claimed in our prior Patent No. 2,203,703, dated June 11, 1940.

In the practice of the present invention dextran and benzyl chloride are caused to react in the presence of alkali such as sodium hydroxide, whereby the benzyl radical is substituted for the hydrogen atom in one or more of the hydroxyl groups in the dextran molecule to produce a soluble product. The degree of solubility of the resulting product will depend upon the number of benzyl radicals in each anhydroglucose unit.

The procedure followed in the production of the soluble benzyl ether of dextran of our invention includes reaction of benzyl chloride and dextran in mole ratios of approximately from 2:1 to 7.5:1. The procedure further provides a two-stage process whereby an insoluble benzyl dextran is first obtained which thereafter undergoes substitution of additional hydrogen atoms by benzyl radicals in the hydroxyl groups of the dextran molecule to yield a soluble product. In other words, an insoluble dextran product such as produced according to our prior Patent No. 2,203,704, dated June 11, 1940 (see claim 6 thereof), would be substantially equivalent to the product of the first stage of the procedure herein described and claimed.

Furthermore, the present application deals with certain improvements of the process described and claimed in our prior Patent No. 2,203,-704, dated June 11, 1940, whereby it is possible to obtain acetone soluble benzyl ether of dextran in a single step by proper selection, control and adjustment of reaction conditions, instead of the acetone insoluble ether obtained according to the process of said patent, as will be more clearly set forth in certain of the typical examples hereinafter to be given.

The soluble benzyl ether of dextran resulting from the practice of the present invention is eminently well adapted to provide protective and decorative coatings which can be applied by brushing or rolling or spreading but preferably by spraying, said coatings being characterized by a rapid rate of drying, high adhesion to supporting surfaces and their inertness to water, certain acids, alkalis, alcohols and other similar solvents, and by having high solubility in certain low priced solvents whereby the product of our invention is made available for use as an industrial coating. Furthermore, such coatings are substantially non-inflammable and form hard, substantially clear, impervious, flexible films without the use of plasticizers, fire-retardants and resins. Such compositions are described and claimed in our prior Patents No. 2,203,705, dated June 11, 1940, and No. 2,236,386, dated March 25, 1941.

PROCESS OF PREPARATION

In order to secure the product of this invention, an aqueous solution of dextran formed by adding dextran to water and heating and stirring the mixture until the dextran is dissolved is heated with benzyl chloride and sodium hydroxide for suitable periods of time and at suitable temperatures. There results from this process either a benzyl ether of dextran which is insoluble in acetone and other similar solvents or a benzyl ether of dextran which is soluble in acetone.

It has been shown that dextran has one of the following formulas:

I

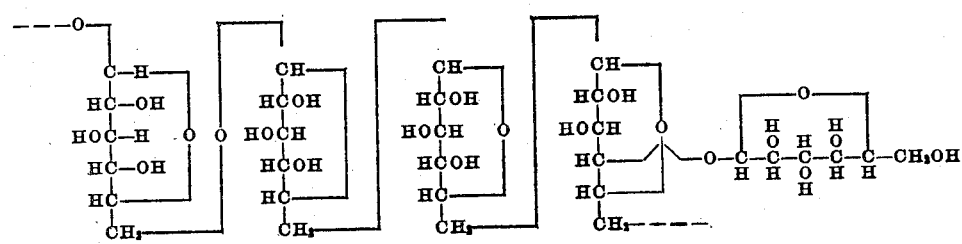

II

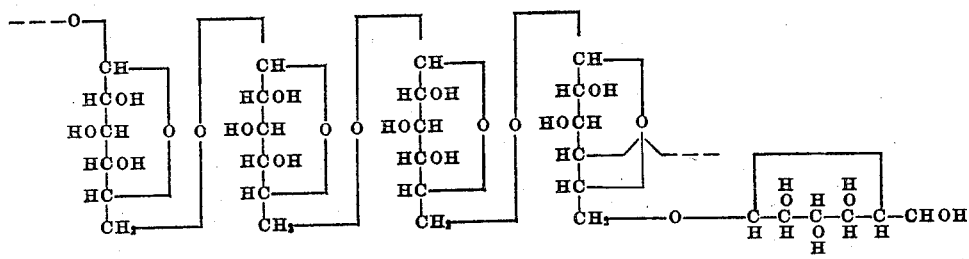

It is apparent that the primary unit of the dextran molecule is a chain of four anhydroglucose residues joined uniformly by glucosidic linkages between the first and sixth carbon atoms of contiguous hexose units. According to Formula I, the fourth hexose unit carries a side chain of one anhydroglucose residue on carbon atom No. 4; according to Formula II, the side chain anhydroglucose unit is attached to the sixty carbon atom and attachment is made to the rest of the molecule through carbon atom No. 4. It is not known how many of these five anhydroglucose units there are in a molecule of dextran but the presence of the side chain separates it definitely in structure from such common polysaccharides as starch and cellulose.

When benzyl chloride is heated with dextran in the presence of sodium hydroxide the benzyl radical is substituted for the hydrogen atom in one or more of the hydroxyl groups in the dextran molecule (see Examples I and II). The acetone-soluble product contains more benzyl radicals in each anhydroglucose unit than does the acetone-insoluble product. The soluble product is the one described herein.

The following are typical examples of the process. It will be understood that the proportions indicated are relative and approximate in the sense that further experience may indicate modifications of the proportions, depending on the type of production machinery employed and other factors. Modifications of temperature, time and pressure may, likewise, be desirable. Mole ratios refer to molecular weights of benzyl chloride used for each hexose unit of dextran.

EXAMPLE I

To 30 grams of dextran dissolved in 100 cc. of water were added 46.5 grams of benzyl chloride (mole ratio of 2:1) and 17 grams of sodium hydroxide, and the mixture refluxed at 105 to 110 degrees C. for six hours. Then 46.5 grams of benzyl chloride (total mole ratio of benzyl chloride to dextran, 4:1) and 17 grams of sodium hydroxide were added, and heating continued at 135 to 145 degrees C. for four hours. Soluble benzyl dextran was obtained.

EXAMPLE II

To 30 grams of dextran in 100 cc. of water were added 93 grams of benzyl chloride (mole ratio of 4:1) and 32 grams of sodium hydroxide, and the mixture refluxed with stirring for 0.5 hour at 75 degrees to 80 degrees C. The temperature was then raised to and held at 135 to 140 degrees C. for 0.5 hour. Again it was slowly raised so that at the end of 1.5 hours it stood at 175 to 185 degrees C., where it was held for an additional 1.5 hours. The total heating period was three hours and the yield of soluble benzyl dextran was good.

EXAMPLE III

Thirty grams of dextran, 100 cc. of water, 47 grams of benzyl chloride (mole ratio of 2:1) and 16 grams of sodium hydroxide were refluxed at 75 to 80 degrees C. with stirring for 0.5 hour. Then 23.5 grams of benzyl chloride (total mole ratio of 3:1) and 10 grams of sodium hydroxide were added, and the temperature raised slowly so that at the end of the first hour it stood at 175 to 185 degrees C., where it was maintained for two hours. Soluble benzyl dextran results.

EXAMPLE IV

Thirty grams of dextran, 82 grams of benzyl chloride (mole ratio of 3.5:1), and 30 grams of sodium hydroxide were heated in an iron vessel, with stirring at 25 lbs. per square inch pressure for 0.5 hour. A soluble benzyl ether of dextran is obtained.

EXAMPLE V

| | | |
|---|---|---|
| Dextran | gm | 30 |
| Benzyl chloride | gm | 90 |
| Sodium hydroxide | gm | 40 |

The product resulting from heating together these materials at temperatures from 140 to 180 degrees C. for 3 to 6 hours is steam-distilled. Other methods may be employed. The resulting product is soluble in such solvents as acetone, Cellosolve, dioxane, ethyl acetate, diacetone, mesityl oxide and chloroform.

Example VI

It has been found that the addition to the product resulting from Example V (after the supernatant liquid has been poured off) of a second batch of 90 grams of benzyl chloride, 40 grams of sodium hydroxide, and 200 cc. of water, and the reheating of the materials under reflux for an additional six hours gives a desirable product. The reaction mixture is steam distilled to recover benzyl chloride and benzyl alcohol. This is a mole ratio of 7.5:1 moles of benzyl chloride to dextran.

Example VII

To 30 grams of dextran dissolved in 100 cc. of water were added 141 grams of benzyl chloride and 45 grams of sodium hydroxide, and the mixture refluxed at 105 to 110 degrees C. for ten hours. The supernatant liquid was poured off, the residue well washed with cold water, and extracted with 400 cc. of acetone. The acetone extract was then poured into cold water to reprecipitate the benzyl dextran, which was then dried in the oven at 90 degrees C. Thirty-six grams of benzyl dextran, representing a yield of 59 per cent of the theoretical amount of 63 grams was obtained. The molecular ratio was 6 moles of benzyl chloride to 1 of dextran.

Example VIII

To 30 grams of dextran dissolved in 100 cc. of water were added 117.5 grams of benzyl chloride and 38 grams of sodium hydroxide, and the mixture refluxed for ten hours at 105 degrees to 110 degrees C. With the same purification procedure as was described before, 28 grams of benzyl dextran were obtained, a yield of 44 per cent of the theoretical. The molecular ratio of benzyl chloride to dextran in this case was 5:1.

Example IX

To 30 grams of dextran dissolved in 100 cc. of water were added 93 grams of benzyl chloride and 32 grams of sodium hydroxide, and the mixture refluxed at 105 degrees to 110 degrees C. for ten hours. After the usual purification, a yield of 12 grams (19 per cent) of acetone-soluble, and 23 grams (37 per cent) of acetone-insoluble benzyl dextran were obtained. The molecular ratio of benzyl chloride to dextran was 4:1.

Example X

To 30 grams of dextran dissolved in 100 cc. of water were added 23.5 grams of benzyl chloride (mole ratio of 1:1) and 10 grams of sodium hydroxide, and the mixture heated at 105 to 110 degrees C. for six hours. At the end of this time, 70 grams of benzyl chloride (bringing the final mole ratio to 4:1) and 25 grams of sodium hydroxide were added and heating continued at 135 to 140 degrees C. for 4 hours more. Thirty-one grams (49 per cent yield) of acetone-soluble benzyl dextran were obtained.

Example XI

To 30 grams of dextran dissolved in 100 cc. of water were added 70 grams of benzyl chloride (mole ratio of 3:1) and 25 grams of sodium hydroxide, and the mixture heated as before at 105 to 110 degrees C. for 6 hours. With the addition of 23 grams of benzyl chloride (bringing the total mole ratio to 4:1) and 10 grams of sodium hydroxide, the mixture was heated for an additional 4 hours at 135 to 140 degrees C. The yield of acetone-soluble benzyl dextran was 48 grams, of 76 per cent of the theoretical.

Example XII

To 30 grams of dextran dissolved in 100 cc. of water were added 58.75 grams of benzyl chloride (mole ratio of 2.5:1) and 20 grams of sodium hydroxide, and the mixture heated with stirring for 3.5 hours at 75 to 80 degrees C. At the end of this time, 35.3 grams of benzyl chloride (bringing the total mole ratio to 4:1) and 12 grams of sodium hydroxide were added, and heating continued at 135 to 145 degrees C. for 0.5 hour, and then at 175 to 185 degrees C. for 2 hours. The total period of heating was 6 hours.

Example XIII

To 30 grams of dextran in 100 cc. of water were added 93 grams of benzyl chloride (mole ratio of 4:1) and 32 grams of sodium hydroxide and the mixture heated at 105 to 110 degrees C. for 0.5 hour. During the next one-half hour the temperature was slowly raised so that at the end of the first hour of heating it stood at 135 to 140 degrees C. and it was then further raised to 175 to 185 degrees C. where it was held for a period of three hours giving a total heating period of four hours.

Example XIV

To 375 cc. of a culture medium containing 30 grams of dextran were added 47 grams of benzyl chloride (mole ratio of 2:1) and 16 grams of sodium hydroxide, and the solution heated at 75 to 80 degrees C. for 0.5 hours with stirring. The temperature was then raised and held at 105 to 110 degrees C. for one hour. Forty-seven grams of benzyl chloride (making the total mole ratio 4:1) and 16 grams of sodium hydroxide were added, the mixture heated at 120 degrees to 125 degrees C. for one hour, and at 155 to 160 degrees C. for three hours.

Solvents

The following is a table giving the solubility characteristics of this product:

| Solvent | Soluble | Insoluble | Softens |
|---|---|---|---|
| Water | | X | |
| 2N HCl | | X | |
| 2N NaOH | | X | |
| Methyl alcohol | | X | |
| Ethyl alcohol | | X | |
| Isoamyl alcohol | | X | |
| Glycerol | | X | |
| Glycol | | X | |
| Cellosolve | X | | |
| Dioxane | X | | |
| Ethyl acetate | X | | |
| Butyl acetate | X | | |
| Acetone | X | | |
| Diacetone | X | | |
| Mesityl oxide | X | | |
| Chloroform | X | | |
| Benzene | | | X |
| Toluene | | | X |

Two points of particular interest are to be noted in the table: (1) the insolubility of the benzyl dextran in water, alkalis, acids and the common alcohols, and (2) its solubility in the cheap commercial solvents, acetone, ethyl acetate and butyl acetate. By properly regulating the proportions of these solvents in the finished lacquer it is possible to obtain a wide variation in the rate of drying. It is comprehended within the term "solvent" or the use of the terms "acetone," "butyl acetate" or "ethyl acetate," such other equivalent solvents as may from time to time be available in this connection. Under some circumstances it is found desirable to mix with such solvents others to bring the evaporation rate to such controlled rate as may be desired, as the rate of evaporation with acetone or ethyl acetate is very high.

The proportions of solvent and benzyl ether of dextran depend upon the type of coating to be employed. It has been found that 20 per cent solids and the balance solvents is a satisfactory proportion for some types of coatings.

It will be noted by reference to the examples given herein that the temperature during the first stage may be from 75 to 80 degrees C. (Examples III and XII); 75 to 110 degrees C. (Example XIV); 105 to 110 degrees C. (Examples I, X and XI); and 140 to 180 degrees C. (Example VI). In the second stage of the reaction the temperature may be from 135 to 145 degrees C. (Examples I, X and XI); 135 to 140 (Examples X and XI); 120 to 160 degrees C. (Example XIV); and 175 to 185 degrees C. (Example III).

It will be also noted by reference to the examples given herein that the mole ratio of benzyl chloride to dextran during the first stage may be from 1:1 (Example X) to 4:1 (Example VI). In the second stage of the reaction the mole ratio of benzyl chloride to dextran may be from 3:1 (Example III) to 7.5:1 (Example VI).

It will be noted in addition that the weight ratio of dextran to sodium hydroxide during the first stage may be from 3:1 (Example X) to 3:4 (Example VI) and that in the second stage it may be from 3:2.6 (Example III) to 3:8 (Example VI).

Furthermore, it will be noted that during the first stage the reaction period may be from one-half hour (Example III) to six hours (Examples I, X and XI) and that during the second stage it may be from two hours (Example III) to six hours (Example VI).

With reference to the single-stage method, it will be noted by reference to the examples given herein that the temperature may be from 75 to 185° C. (Example II). It will also be noted that the mole ratio of benzyl chloride to dextran may be from 4:1 (Examples II, V, IX and XIII) to 6:1 (Example VII). Furthermore, it will be noted that the weight ratio of dextran to sodium hydroxide may be from 3:3.2 (Examples II, IX and XIII) to 3:4.5 (Example VII). In addition, it will be noted that the reaction time may be from three hours at from 75 to 185° C. (Example II) to ten hours at 105 to 110° C. (Examples VII, VIII and IX). In other words, while the reaction time includes the range disclosed and claimed in our prior Patent No. 2,203,704, dated June 11, 1940 (the product of which is insoluble in solvents of the class herein disclosed), the time-temperature relationship differs. Lower temperatures require longer treatment, and higher temperatures shorter treatment. The time-temperature relationship disclosed in the examples herein differs from that employed in the investigation which led to the invention disclosed and claimed in our said prior Patent No. 2,203,704.

In pointing out the mole ratio range of benzyl chloride to dextran and the weight ratio range of dextran to sodium hydroxide in the single-stage method, we have not made reference to Example IV (which shows lower ratios) because of the fact that it covers an experiment conducted under superatmospheric pressure and therefore not directly comparable with the other examples.

The dextran itself is produced by bacterial action and the benzyl ether of dextran therefore may be considered as the product of combined bacteriological and chemical action such as described in our prior Patents Nos. 2,203,702; 2,303,703; and 2,203,704, all dated June 11, 1940. Whenever the methods disclosed in said applications are followed, such methods should be modified in accordance with the disclosure herein.

As has been stated hereinbefore, the reaction is carried out in two stages; firstly, the insoluble benzyl dextran is produced and secondly, substitution of additional hydrogen atoms by benzyl radicals in the hydroxyl groups is made to yield a soluble product. However, as it also has been stated hereinbefore, a single-stage procedure may be used if proper selection, control and adjustment of the reaction conditions is made.

It will be understood that while we have herein described certain embodiments of our invention, it is not our intent thereby to have it limited to or circumscribed by the specific details of procedure and proportions indicated in view of the fact that our invention is adapted to modifications within the spirit of our disclosure and the scope of the appended claims.

We claim:

The 2-stage method of producing soluble benzyl ether of dextran which comprises: heating together 30 grams of dextran, 90 grams of benzyl chloride, and 40 grams of sodium hydroxide at a temperature of from 140 to 180° C. for a period of from 3 to 6 hours; decanting the supernatant liquid; adding to the residue 90 grams of benzyl chloride, 40 grams of sodium hydroxide, and 200 cc. of water, and reheating the mixture under reflux for an additional period of 6 hours; and thereafter removing benzyl chloride and benzyl alcohol from the resulting mixture, whereby there is produced a benzyl ether of dextran soluble in solvents of the class consisting of acetone, Cellosolve, dioxane, ethyl acetate, diacetone, mesityl oxide, and chloroform.

WARNER W. CARLSON.
GRANT L. STAHLY.